United States Patent [19]

Hasegawa

[11] 4,423,449
[45] Dec. 27, 1983

[54] MOVABLE MAGNETIC HEAD BLOCK ASSEMBLY FOR A DOUBLE SIDED FLEXIBLE DISK STORAGE DEVICE

[75] Inventor: Tadashi Hasegawa, Chigasaki, Japan

[73] Assignee: Mitsubishi Denki Kabushiki Kaisha, Tokyo, Japan

[21] Appl. No.: 292,182

[22] Filed: Aug. 12, 1981

[30] Foreign Application Priority Data

Oct. 9, 1980 [JP] Japan .................................. 55-141548

[51] Int. Cl.³ ............................. G11B 5/54; G11B 5/48
[52] U.S. Cl. ...................................... 360/106; 360/99; 360/105
[58] Field of Search .................... 360/99, 106, 97, 105, 360/104

[56] References Cited

U.S. PATENT DOCUMENTS

| | | | |
|---|---|---|---|
| Re. 29,380 | 8/1977 | Castrodale et al. | 360/99 |
| 3,975,774 | 8/1976 | Helbers | 360/99 |
| 4,089,029 | 5/1978 | Castrodale et al. | 360/99 |
| 4,253,125 | 2/1981 | Kanamuller | 360/99 |
| 4,306,258 | 12/1981 | Higashiyama et al. | 360/99 |
| 4,328,521 | 5/1982 | Pexton et al. | 360/105 |
| 4,355,339 | 10/1982 | King et al. | 360/99 |

Primary Examiner—Alfred H. Eddleman
Attorney, Agent, or Firm—Wenderoth, Lind & Ponack

[57] ABSTRACT

Disclosed is a movable magnetic head block assembly for a double sided flexible magnetic disk storage device, wherein a pair of mutually opposed disk contacting surfaces, at least one of which comprises an electromagnetic transducer head, are in contact under pressure with the opposite sides of a magnetic disk so that information can be recorded or retrieved from the disk. To enable the unimpeded exchange of disks, an arrangement is provided whereby at least one of the disk contacting surfaces is mounted on an individual flexibly mounted retractable support arm which is normally urged under pressure against a stop, in the direction of the disk to place the disk contacting surfaces in position for normal operation, but which can be retracted against that pressure, thus withdrawing the disk contacting surface away from the surface of the disk, so that the disk may be exchanged without impediment. At least one of these flexibly mounted support arms is included in a position adjustable support arm assembly, comprising an arm which the head is mounted, an anchor member and a flexible means connecting the two, the adjustment of the position of the anchor member enabling the positioning of the disk contacting surface with respect to the rotational center of the disk to be effected, by a suitable known method, with accuracy, simply and reliably, without the requirement of any extraordinary skill.

6 Claims, 5 Drawing Figures

MOVABLE MAGNETIC HEAD BLOCK ASSEMBLY FOR A DOUBLE SIDED FLEXIBLE DISK STORAGE DEVICE

BACKGROUND OF THE INVENTION

This invention relates to movable magnetic head block assemblies employed in double sided flexible magnetic disk storage devices, and in particular relates to a construction thereof which allows easy, accurate and reliable position setting of the magnetic heads in relation to the rotational center of the magnetic disk.

2. Description of the Prior Art

In the current state of the information storage art, double sided flexible magnetic disk storage devices are widely used as the auxiliary or secondary storage equipment associated mainly with small scale computers. In such devices, the storage medium, the double sided flexible magnetic disk, can be removed and replaced, and accordingly to ensure uniformity and compatibility between magnetic disks recorded on the same or other machines, the positioning of the electromagnetic transducers—the heads—in relation to the rotational center of the magnetic disk, along three axes, i.e. the radial direction of the disk, the direction tangential to the tracking circumference, and the azimuth, i.e. the angle of the head gap with relation to the recording track direction, must be executed with high accuracy, consistency, and reliability.

However, in the use of a flexible magnetic disk, it has been considered desirable to apply a balanced tracking pressure on both sides of the disk at the point of contact between the transducers and the surface of the magnetic disk so that the mechanical pressure of the functional head on the magnetic disk can be counteracted to prevent the magnetic disk from being distorted thereby. For this purpose a pair of mutually opposed magnetic disk contacting surfaces which contact substantially directly opposite portions of the opposite surfaces of the magnetic disk are brought into contact with the surfaces of the magnetic disk when the same is inserted into the head block assembly for operation. Either or both of these contacting surfaces may comprise a magnetic head, whereby either or both sides of the magnetic disk may be recorded on or read from, the arrangement with heads on both sides of the disk being particularly useful in that it allows both sides of the disk to be employed alternately or continuously without having to turn the disk over. A construction employing heads on both sides of the disk is described in U.S. Pat. No. 4,089,029, dated May 9, 1978, issued to Castrodale et al, and reference may be made thereto for further details.

As described in the abovementioned patent, however, with contacting surfaces in simultaneous contact with both sides of the disk, removal of the disk would be impeded unless some arrangement were provided to temporarily retract or lift the heads away from the surface to allow unimpeded insertion or removal of the disk. This is particularly true with the most widely used type of flexible magnetic disk where the magnetic disk is permanently housed in a jacket with central holes being provided in the jacket to allow engagement between the disk drive mechanism and the disk, and with substantially parallel slots in the jacket on either side of the disk in which slots the heads move during operation. With this type of disk, unless an arrangement is provided to retract one or both of the contacting surfaces so that a gap at least greater than the greatest thickness of the jacket of the flexible magnetic disk, the contacting surfaces would foul on the jacket, causing damage to the contacting surfaces or to the flexible magnetic disk, or physically preventing the removal or insertion of the flexible magnetic disk.

Typically in the prior art the means for allowing the contacting surfaces to be retracted from the surface of the magnetic disk comprised mounting the contacting surfaces on support arms which were flexibly joined via thin cantilever springs to a carriage, such that the arms could be raised at one end, the contacting surface supporting end, either independently or, there was two arms, cooperatively together, via a suitable means of mechanical interconnection, through an arc about a point of flexure in the cantilever springs and against the pressure of those cantilever springs and any auxiliary pressure spring. The thin leaf springs were secured to the carriage by means of screws which directly clamp down the thin springs against the carriage.

The aforementioned position setting of the magnetic heads in this arrangement was carried out essentially in two stages, comprising a first stage, an approximate positioning stage, including the mounting of the magnetic heads on their respective arms, and a second stage of accurately positioning the magnetic heads in relation to the rotational center of the disk, comprising adjusting the position of the arms by loosening the screws fastening the carriage end of the cantilever springs to the support frame, adjusting the position of the arms, and hence the magnetic heads, in accordance with a test signal recorded on a setting-up magnetic disk, and then retightening the screws to secure the arms in the correct positions.

However, the torque of the screws being tightened down on the thin (typically approximately 0.1 mm thick by 20 mm wide) cantilever leaf springs while the support arm to which the other end of the spring is fixed was held in position was frequently sufficient to produce internal stresses within the cantilever springs, resulting in elastoplastic deformations of the cantilever springs which in turn caused a slight displacement of the head carrying arms supported thereby after the hold on the support arm end of the spring on released, leaving the heads in positions away from those set prior to the tightening of the screws. In practice, a method was sought to circumvent the effects of this phenomenon by anticipating this deformation-caused displacement and presetting the head carrying arms on their cantilever springs in positions offset from the ideal, correct, positions, in a direction opposite to that of the anticipated displacement that might result from the inevitable elastoplastic deformation, and by an amount equal to the estimated displacement, such that any such elastoplastic deformation induced displacement would, in theory at least, simply return the arm to the ideal, correct position. However the estimation of the elastoplastic deformation was a matter requiring considerable skill and experience, and even with these, the exercise remained a matter of trial and error, often requiring repeat operations to achieve acceptable positioning accuracy. The fact that the operation was thus one requiring great skill, and still involved the possibility of having to repeat the operation, thus made this prior method of position setting rather unsuitable for volume production.

SUMMARY OF THE INVENTION

It is an object of the present invention to do away with the aforementioned drawbacks of the prior art by presenting a movable magnetic head block assembly for a double sided magnetic disk storage device which is well suited to industrial production by the position setting of the magnetic heads therein with respect to the rotational center of the magnetic disk being able to be effected with accuracy, simply and reliably, without the exercise of any extraordinary skill.

This and other objects of this invention are achieved according to this invention by mounting at least one of the magnetic heads on a support arm which is flexibly mounted to an anchor member via means such as a cantilever leaf spring firmly secured by means such as screws to the anchor member which is separately firmly secured by means such as screws to a head assembly carriage, whereby fine positional adjustment of the position of the magnetic head relative to the rotational center of the magnetic disk can be achieved by any suitable known positioning method, after which the relative positions of the heads can be reliably and accurately maintained by mechanically rigidly securing the position adjustable head assembly or assemblies to the head assembly carriage by mechanical means such as screws or adhesive bonding, the anchor member being of sufficient rigidity to resist elastoplastic deformation, thereby ensuring that the set positions of the magnetic heads remain as set.

BRIEF DESCRIPTION OF THE DRAWINGS

Other objects and advantages of this invention will become apparent from the following description taken in conjunction with the accompanying drawings, wherein.

DESCRIPTION OF THE PREFERRED EMBODIMENTS

Figure 1:
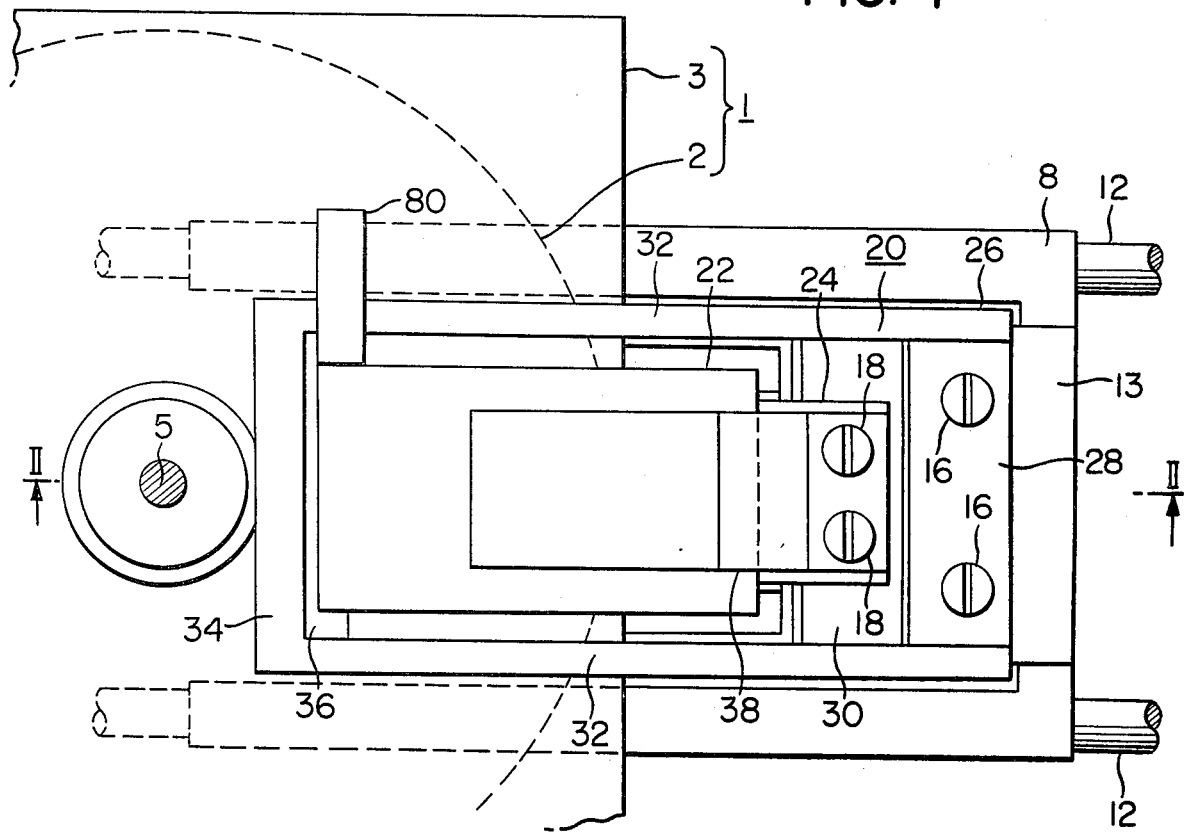
FIG. 1 is a plan view of a movable magnetic head block assembly according to the present invention.
Figure 2:
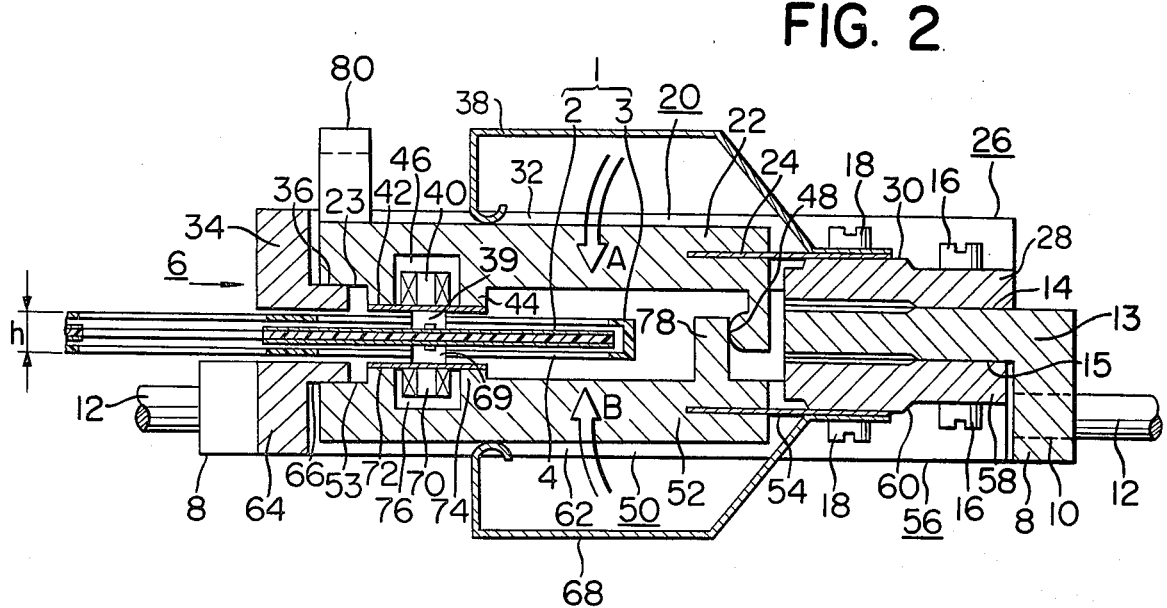
FIG. 2 is a longitudinal sectional view taken along the line II—II in FIG. 1.

Referring now to FIGS. 1 and 2 wherein is shown an embodiment of a movable magnetic head block assembly for a double sided flexible magnetic disk storage device, according to the present invention, a floppy disk 1, comprising a jacket 3 housing a disk 2 coated on both sides with a magnetic material is inserted into a movable magnetic head block assembly 6 with slots 4 provided on each side of the jacket 3 to allow the magnetic heads 40 and 70 within the head assembly 6 to pass through to make intimate contact with the surfaces of the disk 2 to allow information to be recorded on or retrieved from either side of the disk 2 while it is rotated by any suitable known drive means, about its rotational center 5. The movable magnetic head block assembly 6 includes a carriage 8 mounted in sliding relationship on a pair of parallel rails or rods 12, parallel to a radius of the floppy disk, the rods 12 passing through through-holes 10 provided in the lower portion of the carriage 8. The carriage 8 is arranged to be suitably driven by a suitable well-known drive means (not shown) in coordination with the rotation of the magnetic disk 2 to enable the whole of the usable surface of the disk 2 to be recorded on or read from. Extending vertically and then horizontally towards the rotational center 5 of the disk 2, from the end of the carriage 8 away from the rotational center 5 of the disk 2 substantially in parallel to the lower portion of the carriage 8, is a support spar 13, to the upper and lower sides 14 and 15 of which are respectively mechanically rigidly fixed by mechanical fixing means such as screws 16, an upper support arm assembly 20 and a lower support arm assembly 50. The screws 16 in the illustrated embodiment pass through holes (not shown) provided in the anchor member portions 28 and 58 of arm assemblies 20 and 50 to engage with suitably threaded holes (not shown) provided in the support spar 13, and are arranged so that they may be backed off and then retightened to allow fine adjustment of the positions of the arm assemblies 20 and 50 with respect to the spar 13.

Each support arm assembly 20 and 50 respectively comprises an anchor member 28 and 58, and a support arm 22 and 52 flexibly joined via cantilever type leaf springs 24 and 54, typically formed of stainless steel and about 0.1 mm thick by 20 mm wide, to opposite ends of which the support arm 22 or 52 and the anchor member 28 or 58 are respectively mechanically rigidly fixed, by means such as a firm press fit and screws 18 respectively. The anchor member 28 and 58 may optionally, as illustrated, be provided with raised rigid plinths 30 and 60 to which the cantilever springs 24 and 54 are respectively mechanically rigidly secured by screws 18 which pass through holes (not shown) in the cantilever springs 24 and 54 to engage with suitably threaded holes (not shown) provided in the plinth portions 30 and 60 of the anchor members 28 and 58. At least a portion of the cantilever springs 24 and 54 between the anchor members 28 and 58 to which they are fixed, and the supports arms 22 and 52, is exposed so that the support arms 22 and 52 are able to be compliantly moved against the pressure exerted by the cantilever springs 24 and 54 about a point of flexure in the exposed portions of the cantilever springs 12 and 32. The flexible means employed, in this embodiment cantilever leaf springs 12 and 32, should be fundamentally of a nature that allows movement in one direction only, i.e. the direction of or opposite to the arrows A and B in FIG. 2, while providing resistance to lateral and longitudinal movement, to ensure accurate positioning of the heads in normal operation. For this purpose a leaf spring is ideal as it allows flexing, or movement, only in the direction perpendicular to its surface of maximum area. Additionally the use of a leaf spring as opposed to other suitable flexible means, such as hinges, allows the flexing means to supply at least a portion of the force required to urge the support arms 22 and 52 in the directions shown by the arrows A and B respectively, with sufficient force to prevent the support arms 22 and 52 from being disturbed by undulations or surface irregularities in the disk 2. In the illustrated embodiment, the force thus exerted is augmented by the provision of auxiliary pressure leaf springs 38 and 68, which are positioned with their one ends placed on top of the fixed ends of the cantilever springs 24 and 54 respectively and secured by the screws, the aforementioned screws 18, that secure the cantilever springs 24 and 54, and with their other ends free, but arranged so as to physically contact the surfaces of the support arms 22 and 52 away from the disk 2 to apply additional pressure to the support arms 22 and 52 to urge them in the directions shown by the arrows A and B respectively, in cooperation with the cantilever springs 24 and 54. The movement in the directions A and B is physically constrained at a suitable point by stops, or lips, 36 and 66 against which the pressure of the cantilever springs 24 and 54, and the auxiliary pressure springs 38 and 68 urges the support arms 22 and 52 to maintain a normal operation position. In the illustrated embodiment these stops 36 and 66 are provided by extending rigid longitudinal members 32 and 62 from the sides of the respective anchor members 28 and 58, to which they are mechanically rigidly joined, or with which they are rigidly integrally formed, and spanning cross members 34 and 64 between the longitudinal members 32, or 62, said cross members 34 and 64 being mechanically rigidly joined to or rigidly integrally formed with the longitudinal members 32 or 62, and having the stops 36 and 66 extending inwardly of the frames 26 and 56 respectively formed by the anchor members 28 and 58, the longitudinal members 32 and 62 and the cross members 34 and 64, to be engaged on the upper surface thereof by the disk side surfaces of the leading edges 23 and 53 of the support arms 22 and 52.

To the mutually opposed surfaces of the upper and the lower support arms 22 and 52, is fitted an electromagnetic transducer head assembly, comprising a mutually opposing pair of disk contacting surfaces, 39 and 59 which, in the present embodiment, respectively include upper and lower electromagnetic transducers, magnetic head groups 40 and 70, of any known suitable construction each including the necessary elements to perform the desired functions of erasure, recording and retrieval of information on the respective sides of the disk 2, each head group 40 and 70 being mounted respectively on the support arms 22 and 52 at positions on the mutually opposing surfaces thereof which are also substantially mutually opposed, at a point near to the ends of the arms 22 and 52 away from the ends to which the cantilever springs 24 and 54 are fixed. The magnetic head groups 40 and 70 are respectively resiliently mounted on the support arms 22 and 52 via flexible means such as leaf springs 42 and 72 by means of a pressure fit or adhesive bonding, and the springs 42 and 72 in this embodiment are pressure fit or adhesive bonded to projecting ridge-like portions 44 and 74 surrounding depressions 46 and 76, over which the magnetic heads 40 and 70 are mounted. The leaf springs 42 and 72 serve to press the magnetic head groups 40 and 70 against the surfaces of the disk 2 with a required force, while allowing a certain resilience to accomodate movement induced by undulations and surface irregularities in the surface of the disk 2 during use.

Also provided are means for retracting the magnetic head groups 40 and 70 away from the surface of the disk 2 to allow a floppy disk 1 to be inserted and withdrawn without impediment or harmful contact between the head groups, 40 and 70, and the floppy disk 1. In the illustrated embodiment these means comprise means for swinging each of the support arms 22 and 52 about a point of flexure in the cantilever springs 24 and 54, against the pressure of the cantilever springs 24 and 54 and the auxiliary springs 38 and 68, so that the magnetic head groups 40 and 70 carried thereon are separated by a distance at least greater than h, the thickness of the floppy disk 1. The mechanism by which the support arms 22 and 52 are retracted comprises a cross-piece 80 mechanically rigidly fixed to or formed integrally with the upper support arm 22, arranged to be physically engaged by hand or by any suitable mechanical or electromechanical arrangement capable of withdrawing the support arm 22 against the pressure of the leaf springs 24 and 38, in the direction opposite to the direction of arrow A. This arrangement may be duplicated for the lower support arm 52, or, for simplicity, the upper and lower support arms 22 and 52 may be mechanically interlinked so that a withdrawal of the upper support arm 22 creates a corresponding movement in the lower support arm 52. This is most easily achieved as illustrated by providing a peg 48 extending from the disk side of the rearward (cantilever spring) end of the upper support arm 22 towards the lower support arm 52, with a similar peg 78 extending upwards from the disk side of the lower support arm 52 towards the upper support arm 22 at a position just forwards of the upper peg 48, with the front face of the upper peg 48 engaging the rear face of the lower peg 78 whereby rotation of the upper support arm 22 in a direction opposite to the direction of arrow A forces the lower support arm 52 to imitate such rotation, but in an opposite sense, i.e. in a direction opposite to the direction of arrow B. The portion of either of the contacting pegs 48 and 78 which is in contact with the surface of the other peg (in the illustrated embodiment the surface of the upper peg 48 contacting the lower peg 78) may be given a smooth rounded shape to provide a smoother "cam" interaction of the pegs.

Next the operation of the movable magnetic head block assembly described above will be explained.

To record or retrieve information in a floppy disk 1, firstly the floppy disk 1 must be inserted into the magnetic head block assembly 6, which magnetic head block assembly 6 will then be suitably driven along the rails 12 in the radial direction of the disk 2 of the floppy disk 1 while the disk 2 is rotated about its central axis or rotational center 5, by a suitable well known drive mechanism (not shown). This arrangement, with magnetic head groups 40 and 70 positioned so that one magnetic head group faces each of the two faces of the disk 2, enables the entire useful surface of the disk 2 to be scanned for recording or retrieval, without having to remove or turn over the floppy disk 1.

However, in operation the magnetic head groups 40 and 70 must be in resilient intimate contact with the surfaces of the disk 2, for which purpose they are mounted on pressure springs 42 and 72 respectively, which urge them against the surfaces of the disk 2. However, with the magnetic head group 40 and 70 in this state, it is not possible to insert or remove floppy disks without damaging either the surfaces of the disk 2, the jacket 3 or the contacting surfaces of the magnetic head groups 40 and 70, so an arrangement is provided whereby the magnetic head groups 40 and 70 can be retracted away from the surface of the disk 2, so that a spacing is provided between them which is at least sufficient to allow the floppy disk 1 to be passed therethrough without physically contacting either magnetic head group 40 or 70. This is achieved in the described embodiment by mounting the magnetic head groups 40 and 70 on flexibly mounted support arms 22 and 52 which are retracted by means of any suitable manual, mechanical, or electromechanical means engaging the crosspiece 80 on the upper support arm 22 to draw the upper support arm 22 in a direction opposite to that shown by the arrow A, against the pressure of the leaf springs 24 and 38, with the motion imparted to the upper support arm 22 being transmitted to and emulated by the lower support arm 52 by virtue of the interaction of the pegs 48 and 78. The upper peg 48, when the upper support arm 22 swings upwards, swings forward also pressing forward the lower peg 78, thus causing the lower support arm 52 to be swung downwards, against the pressure of the leaf springs 54 and 68, through an angle similar to that adopted by the upper support arm 22. Thus the support arms 22 and 52 are able to be suitably simultaneously and correspondingly retracted to allow easy floppy disk exchange. Once the floppy disk exchange is completed the support arms 22 and 52 can be returned to their normal operational positions by reversing the steps involved in the retraction operation. The support arms 22 and 52 will return under the pressure of the leaf springs 24 and 38, and 54 and 68.

Figure 3:
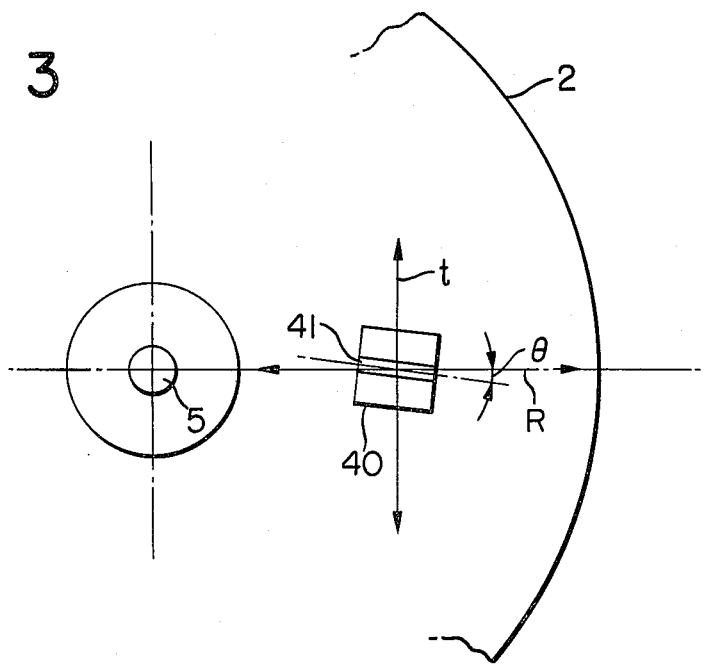
FIG. 3 is a plan view showing the positional relationship between the rotational center of the magnetic disk, and a magnetic gap.

The foregoing is a description of the fundamental mechanical operation and use of the movable magnetic head block assembly according to an embodiment of this invention, but it must also be remembered that the positioning of the head groups in relation to the rotational center of the disk 2 is critical to the reliable, accurate, and compatible recording and retrieval of information on interchangeable floppy disk sources. This positional accuracy, as illustrated in FIG. 3 relates the position and angle of the magnetic gaps 41 of the magnetic head group 40 to three directions in relation to the rotational center 5 of the disk 2, these three directions being the radial direction (R) and the direction (t) tangential to the tracking circumference as well as the azimuth or angle ($\theta$) of the head gap in relation to a line at right angles to the tracking circumference, which is the radial direction of the disk 2. The actual position of the magnetic head groups in a head assembly for a floppy disk storage device will be determined by the agreed technical standards of the art, and is not specifically relevant to this invetion which is concerned primarily with providing a head mechanism wherein whatever the desired position, it can be easily set, and reliably and accurately maintained.

The positioning of the magnetic heads with relation to the disk 2, with the above described embodiment of this invention is carried out as follows. Since the operations to be carried out are the same for the upper and lower magnetic head groups 40 and 70, and their support arm assemblies 20 and 50, for simplicity, a description will be made with respect to one side only, the upper side.

The first step is to position the magnetic head group 40 on the spring 42. The magnetic head group 40 is joined to the spring 42 by adhesive bonding, or a pressure fit, or the like. The second step, or stage, is to position the spring 42 on which the magnetic head group 40 is mounted in the support arm 22, and then to secure the spring 42 to the ridges 44 surrounding the depression 46 over which the magnetic head 40 is positioned, by means such as adhesive bonding, a press fit, or screws, or the like. The third step, or stage is to relatively finely position the support arm 22 in relation to the anchor member 28 by loosening the screws 18 holding the cantilever spring 24 to the plinth portion 30 of the anchor member 28, finding the right position, and then clamping the cantilever spring 24 in place in retightening the screws 18. This process, may result in elastoplastic distortion in the cantilever spring 24, but any displacement that results may be ignored as the position setting accuracy in these steps is not critical, and need only be approximate. The only stipulation is the substantially obvious one that the support arm 22 should be substantially visually correctly positioned, i.e. should not contact any part of the frame 26 apart from the stop 36, when it is moved in either the direction of the arrow A, or the opposite direction. This is to avoid obvious mechanical snarling of the mechanism in operation, and to prepare the mechanism for the final step in the positioning process, the fourth step, or stage, comprising temporarily lightly fixing the anchor member 28 to the fixing surface 14 of the support spar 13 of the carriage 8 by means of clamping screws 16 or the like. Then, by a known method as employed in the prior art, the double sided floppy disk mechanism is set to the read mode, and with a setting-up positional correction floppy disk, on which fine adjustment quantities for the accurate positional dimensions along the three axes with respect to the rotational center of the disk are recorded in steps, inserted in the floppy disk drive mechanism with a magnetic disk inserted between the magnetic head groups 40 and 70, the signal on the disk 2 is read by the head groups 40 and 70, to detect and quantify the degree of misalignment along the three axes, and these amounts are fed back as control amounts to adjust the position of the head group 40 (and 70) by suitably adjusting the position of the anchor member 28 of the support arm assembly 20 to attain the correct position. When this position is achieved, the position of the support arm assembly 20 is maintained by hand or by placing the support arm assembly 20 in a simple support device, and the fixing screws 16 are firmly tightened, after which the support arm 22 within the support arm assembly 20 may be moved in or opposite to the direction of the arrow A about the point of flexure of the cantilever spring 24, with the positional relationship between the head group 40 and the rotational centre of the disk 2 accurately and reliably maintained, as the anchor member 28, which is the last item to have its position secured, is not subject to deviation-producing internal stresses and elastoplastic distortion.

The foregoing method of positional alignment is a significant advance over the prior "trial and error" method which required a high degree of skill, because it circumvents the effects of the internal stresses and elastoplastic deformation in the cantilever spring 24 when the fixing screw is tightened, by making the final adjustment after the spring fixing screws 18 are tightened, so that any distortions that are produced by the tightening of the screws 18 holding the springs in place can be compensated for by suitable adjustment of the position of the entire support arm assembly 20 in relation to the carriage 8.

Figure 4:
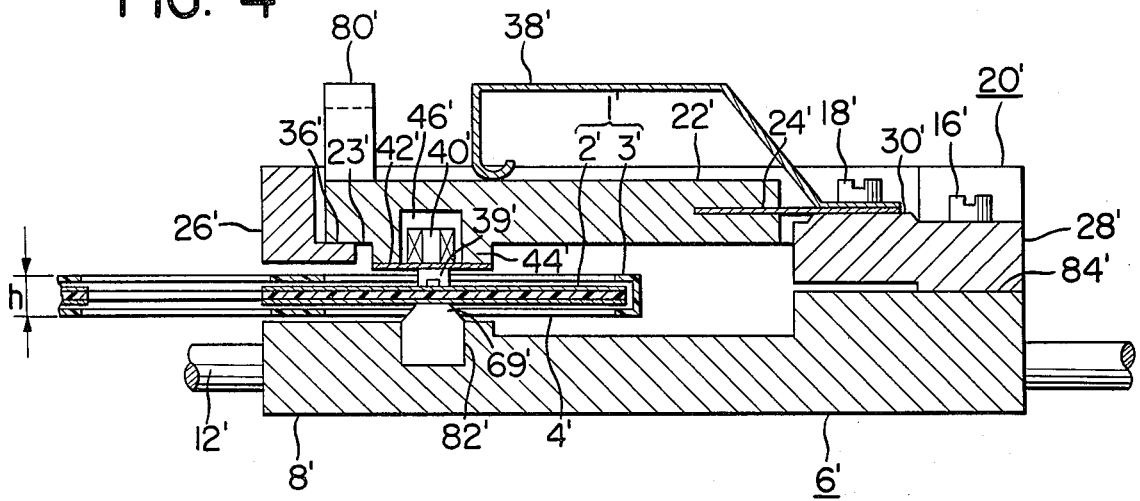
FIGS. 4 and 5 are respectively longitudinal sectional views of other embodiments of the head block assembly according to the present invention.

In the foregoing embodiment each of the disk contacting surfaces 39 and 69 comprised head groups, 40 and 70, and each was mounted on a retractable support arm 22 or 52, via springs 42 or 72, but it is equally possible, as illustrated in cross-section in FIG. 4, to have one of the disk contacting surfaces 69' comprising a non-active component 71' included simply to counteract the pressure of the opposing contacting surface 39' which comprises a head group 40' which is mounted in a support arm assembly 20' similar to either of those included in the above described embodiment, the non-active component 71' being mounted directly on the carriage 8' by adhesive bonding or a press fit, with only the head 40' retractably and adjustably mounted on a support arm 22' in a position adjustable support arm assembly 20', to provide a one side stationary- one side retractable magnetic head block assembly 6'. Parts in the figure which are similar to or correspond to those in FIGS. 1 and 2 are indicated by the same reference numerals, although these have been primed for clarity.

In the embodiment illustrated in FIG. 4, a fixed contacting surface 69' is fitted by adhesive bounding or a press fit into a suitable receptacle 82' provided in the carriage 8'. Opposite to the fixed contacting surface 69' a retractable magnetic head group 40' is adhesive bonded or press fit onto a support spring 42' which is bonded to or press fit into ridge portions 44' surrounding a depression 46', over which the head group 40' is fitted, in a support arm 22'. The support arm 22' is mounted via a cantilever spring 24' to an anchor member 28' to which the cantilever spring 24' is clamped by means of screws 18'. Also head in place by the screws 18' is an auxiliary pressure spring 38' which exerts additional pressure against the support arm 22' to normally urge it against the limiting stop or lip 36' provided on the frame 26' provided in cooperation with the anchor member 28'. Integrally formed with or mechanically rigidly secured to the support arm 22' is a crosspiece 80' which can be suitably engaged to retract the support arm 22' and the head group 40' to allow the unobstructed insertion and removal of a floppy disk 1'. The support arm assembly 20' comprising the support arm 22' the cantilever and auxiliary springs 24' and 38', and the anchor member 28' and frame 26', is secured to the carriage 8' on a mounting surface 84' thereof, by means of screws 16' which can be loosened and retightened to adjust the position of the head group 40' by a method substantially the same as that described with regard to the preceeding embodiment except that with this embodiment the position of the lower contacting surface 69' is not adjusted.

Other details and operations of this embodiment are substantially similar to those of the preceeding embodiment. Note, however, that no interlocking pegs (48 and 78) are employed, or needed, as only one side needs to be raised for floppy disk removal and insertion.

Figure 5:
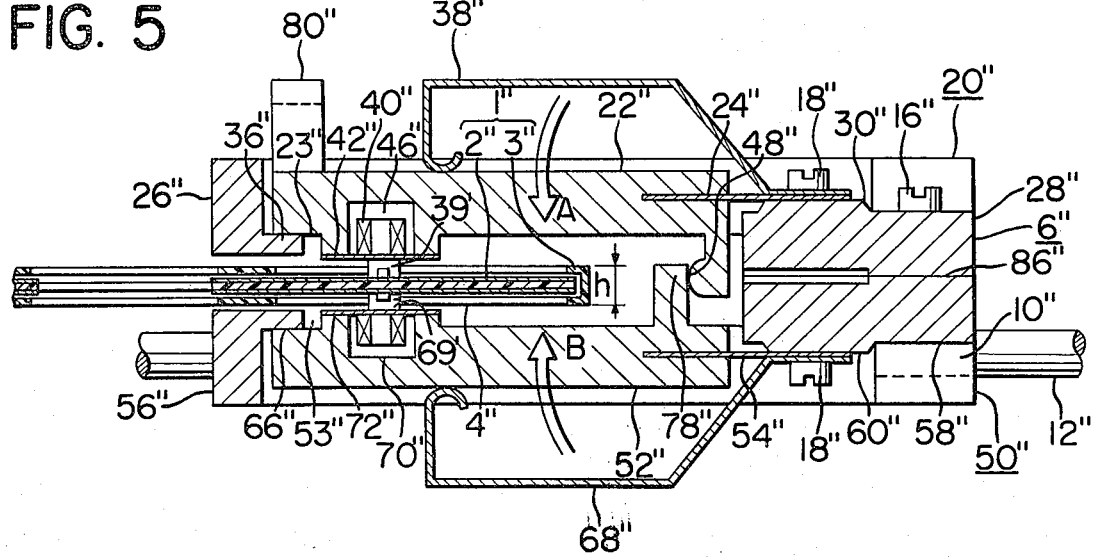

A third embodiment of a movable magnetic head block assembly for a floppy disk storage device according to this invention is illustrated in FIG. 5. In the figure similar or corresponding parts to those in FIG. 1 and 2 are denoted by the same reference numbers, but these have been double primed for clarity.

In the embodiment illustrated in FIG. 5, the contacting surfaces 39" and 69" are each mounted on retractable support arms 22" and 52" mounted via cantilever springs 24" and 54" to anchor members 28" and 58" in support arm assemblies 20" and 50" which are largely similar to those employed in the first above described embodiment, illustrated in FIGS. 1 and 2. However, in the present embodiment the anchor member 58" and associated frame 56" of the lower support arm assembly 50" is integral with the carriage portion which was separate in the embodiment illustrated in FIGS. 1 and 2, and it is provided with through holes 10" through which are passed rails or rods 12" along which the head assembly 6" slides in the radial direction of the floppy disk 1". Since the lower frame 56" is thus integral with the carriage, it is not possible to adjust the relative positions thereof. Accordingly the relative position of the upper contact surface 39" only, is set according to the method described with respect to the first above described embodiment, the position of the lower contact surface 69" being adjusted approximately according to the same steps up to the step of tightening the cantilever and auxiliary spring securing screws 18'. Other details and operations of this embodiment are the same as or similar to those described in relation to the first above mentioned embodiment.

In each of the above described embodiments screws 16, 16' and 16" have been employed to secure to respective position adustable support arm assemblies 20, 50, 20' and 20" to the respective surfaces 14, 15, 84', and 86" of the members 13, 8' and 58" to which they are fixed, with a view to enabling disassembly and readjustment at a later date. However where this facility is not specifically required it may equally be considered to mechanically rigidly secure the respective members, once they have been set in their correct positions, by other means, such as adhesive bonding.

As explained hereinabove, this invention provides a construction wherein a head assembly including a pair of mutually opposed disk contacting surfaces, at least one of which comprises a magnetic head disposed to make resilient intimate contact with the surface of a magnetic disk while the opposite contacting surfaces applies a balancing tracking force to the directly opposite portion of the opposite side of the magnetic disk, the contacting surface comprising a magnetic head is fitted in a support arm assembly wherein the head is fixed via a resilient leaf spring to a retractable support arm, the support arm being provided at its one end with a flexible mounting means such as a cantilever leaf spring by which it is fixed to a rigid position adjustable anchor member, whereby the position of the magnetic head group supported therein can be suitably adjusted and set by a suitable known method, in relation to the rotational center of the disk, and that position can be easily and accurately maintained, without requiring any special skill.

What I claim is:

1. A movable magnetic head block assembly for a double sided flexible magnetic disk storage device comprising:
   an electromagentic transducer head assembly comprising a pair of mutually opposed magnetic disk contacting surfaces which contact substantially directly opposite portions of the opposite surfaces of said magnetic disk such that a balanced tracking pressure is brought to bear on each side of the disk, at least one of said contacting surfaces including an electromagnetic transducer head operative with the magnetic disk on the adjacent side;
   at least one retractable support arm assembly for respectively retractably supporting said at least one contacting surface including the electromagnetic transducer head, said support arm assembly including a support arm on which said head is resiliently mounted, an anchor member having sufficient rigidity to resist plastic deformation, and flexible leaf spring means mechanically rigidly fixed at one end to said support arm and at the other end to said anchor member for causing said support arm to be normally urged in the direction towards the surface of said magnetic disk and to be retractable against the pressure of said leaf spring means about a point of flexure in said leaf spring means;
   a rigid carriage means movable in a radial direction with respect to said magnetic disk and having a fixed stop thereon against which said support arm abuts when urged towards the surface of said magnetic disk;

said anchor member of said at least one support arm assembly being a separate member from said carriage; and means mechanically rigidly securing said anchor member to said carriage and releasable for permitting adjustment of said anchor member relative to said carriage, whereby the position of the contacting surface supported on said support arm can be adjusted and set at least prior to mechanically rigidly securing said anchor means to said carriage, by adjusting the position of the assembled support arm assembly in relation to the carriage.

2. A movable magnetic head block assembly as claimed in claim 1 wherein said head assembly comprises a pair of mutually opposed disk contacting surfaces, and there is a separate support arm assembly to which each of said disk contacting surfaces is resiliently fixed, said support arm assemblies being independently position adjustably mechanically rigidly secured to said carriage.

3. A movable magnetic head block assembly as claimed in claim 2 wherein said carriage includes a lower portion in which are provided through-holes, rods disposed parallel to the radial direction of said magnetic disk and extending through said through-holes and along which said carriage is arranged to move, and a support spar portion which extends vertically from said lower portion and then horizontally towards the rotational center of the flexible magnetic disk from the end of the carriage away from the rotational center of the magnetic disk in parallel to the lower portion of the carriage, and said securing means comprises screws securing said anchor members of said separate upper and lower support arm assemblies adjustably mechanically ridigly to said support spar portion of said carriage.

4. A movable magnetic head block assembly as claimed in claim 1 wherein said head assembly comprises a pair of mutually opposed disk contactin surfaces, each of which is resiliently fixed to a separate support arm assembly, one of said support assemblies being position adjustably mechanically rigidly secured to said carriage, the other of said support arm assemblies being integral with said carriage.

5. A movable magnetic head block assembly as claimed in claim 1 wherein said head assembly comprises a pair of mutually opposed disk contacting surfaces, one of which is resiliently fixed to a support arm assembly, said support arm assembly being position adjustably mechanically rigidly secured to said carriage, and the other of said pair of mutually opposed disk contacting surfaces is fixed directly to said carriage.

6. A movable magnetic head assembly as claimed in any one of claims 1 to 5 further comprising leaf springs resiliently mounting said head on said support arm and said flexible leaf spring means comprises cantilever leaf springs.

* * * * *